United States Patent [19]
Hatch

[11] Patent Number: 5,177,489
[45] Date of Patent: * Jan. 5, 1993

[54] PSEUDOLITE-AIDED METHOD FOR PRECISION KINEMATIC POSITIONING

[75] Inventor: Ronald R. Hatch, Willmington, Calif.

[73] Assignee: Magnavox Electronic Systems Company, Fort Wayne, Ind.

[*] Notice: The portion of the term of this patent subsequent to Oct. 16, 2007 has been disclaimed.

[21] Appl. No.: 805,268

[22] Filed: Dec. 10, 1991

Related U.S. Application Data

[60] Continuation-in-part of Ser. No. 558,911, Jul. 27, 1990, Pat. No. 5,072,227, which is a division of Ser. No. 413,411, Sep. 26, 1989, Pat. No. 4,963,889.

[51] Int. Cl.⁵ .................................................. G01S 5/02
[52] U.S. Cl. ..................................... 342/357; 342/450
[58] Field of Search ............... 342/357, 380, 450, 453

[56] References Cited

U.S. PATENT DOCUMENTS 4,963,889  10/1990  Hatch ................................... 342/357
5,072,227  12/1991  Hatch ................................... 342/357

*Primary Examiner*—Mark Hellner
*Attorney, Agent, or Firm*—Noel F. Heal; Richard T. Seeger

[57] ABSTRACT

A technique using pseudo-satellites, or "pseudolites," for resolving whole-cycle ambiguity that is inherent in phase-angle measurments of signals received from multiple satellite-based transmitters in a global positioning system. The relative position of a secondary receiving antenna with respect to a reference antenna is approximately known or approximately initially determined and then measurements from a minimum number of satellites are used to determine an initial set of potential solutions to the relative position of the secondary antenna that fall within a region of uncertainty surrounding the approximate position. Redundant measurements are taken from one or more pseudolites, and used to progressively reduce the number of potential solutions to close to one. Each pseudolite is positioned such that its angular position as seen from the secondary antenna changes rapidly as the antenna is moved along an intended path, thus providing rapidly changing redundant measurements, which are used to eliminate false solutions more quickly. The disclosed technique produces rapid elimination of false solutions and permits real-time computation of relative position in kinetic positioning applications.

10 Claims, 3 Drawing Sheets

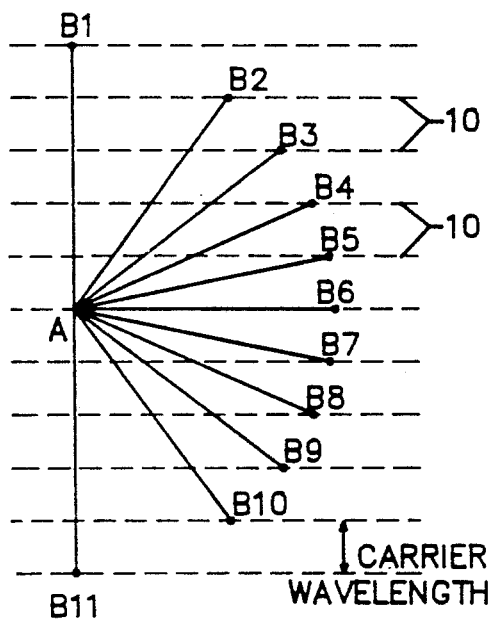
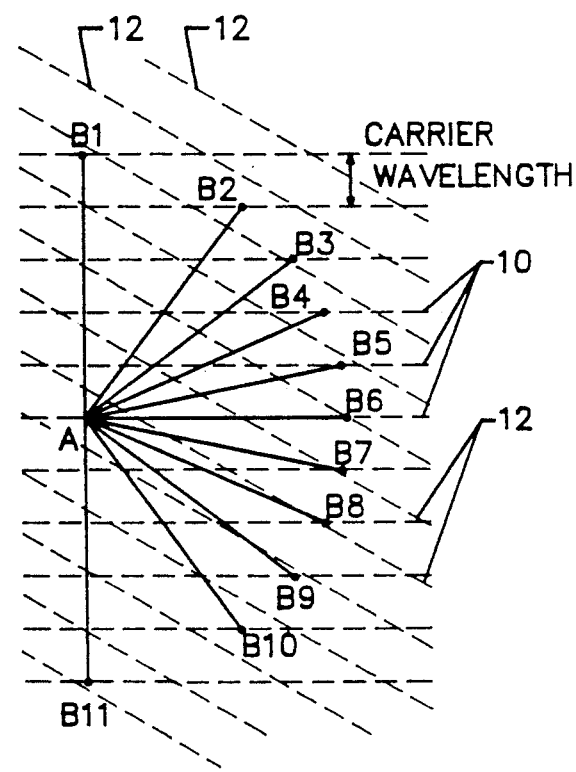
FIG. 1
FIG. 2
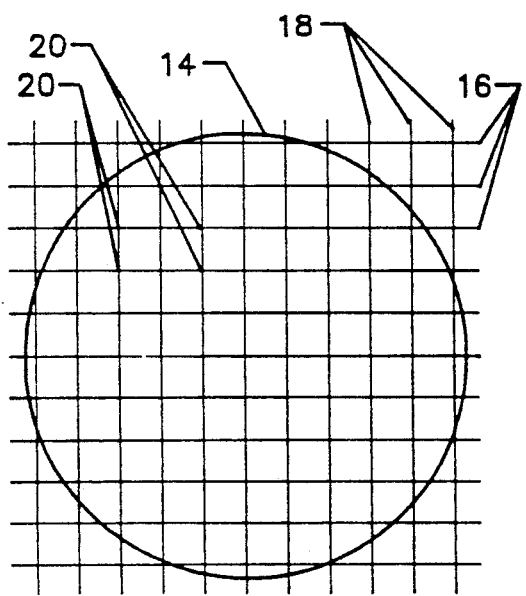
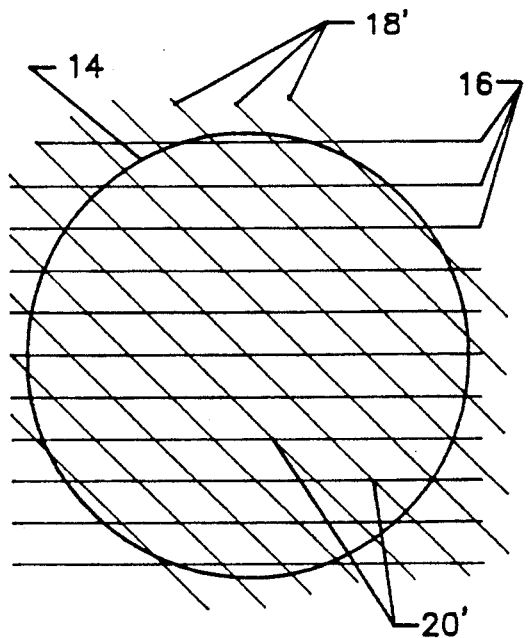
FIG. 3
FIG. 4

PSEUDOLITE-AIDED METHOD FOR PRECISION KINEMATIC POSITIONING

CROSS-REFERENCE TO RELATED APPLICATION

This is a continuation-in-part of application Ser. No. 07/558,911 filed Jul. 27, 1990, Ronald R. Hatch, entitled "Method and Apparatus for Precision Attitude Determination," now issued as U.S. Pat. No. 5,072,227 which was a divisional of application Ser. No. 07/413,411, filed Sep. 26, 1989 entitled "Method and Apparatus for Precision Kinematic Positioning," now issued as U.S. Pat. No. 4,963,889.

BACKGROUND OF THE INVENTION

This invention relates generally to positioning systems using signals broadcast from a plurality of orbiting satellites and, more particularly, to satellite-based differential positioning systems that determine the position coordinates of one receiver, referred to as a remote receiver, relative to the known position of another, referred to as the reference receiver.

There are two types of applications in which measurements of this kind may be usefully employed. One is referred to as kinematic positioning, in which the remote receiver may be moved with respect to the reference receiver, and the distance between the remote receiver and reference receiver is, therefore, not initially known. The other application is attitude determination, in which the distance between the remote and reference receivers is fixed, and the position of the remote receiver is used to determine the angular position of a line or chord joining the two receiver antennas. If three antennas are used instead of two, the angular position of a plane intersecting the three antennas can be determined from the relative positions of two of the antennas with respect to the third, used as a reference. Attitude determination has application in navigation systems on or above the earth. Using a platform having three antennas, the roll, pitch and yaw angles of a platform supporting the three antennas can be determined.

Satellite-based positioning systems, such as the Global Positioning System (GPS), provide a now widely used means for accurately determining the position of a receiver in three-dimensional space. These systems have numerous practical applications and, depending on the time duration over which measurements are taken, they can determine a receiver's position to subcentimeter accuracy.

In GPS, a number of satellites orbiting the earth in well-defined polar orbits continually broadcast signals indicating their precise orbital positions. Each satellite broadcasts two modulated carrier signals, designated $L_1$ and $L_2$. The same two frequencies are used in transmitting from all of the satellites, but the satellites have unique pseudorandom digital codes that are used to modulate the $L_1$ and $L_2$ carriers. Each satellite signal is based on a precision internal clock, and the multiple clocks are effectively synchronized by ground-based stations that are a necessary part of GPS. The receivers detect superimposed modulated $L_1$ and $L_2$ signals and measure either or both of the code and carrier phase of each detected signal, relative to their own internal clocks. Even though a receiver clock is not synchronized with the satellite clocks, a receiver can nevertheless determine the "pseudorange" to each satellite based on the relative time of arrival of the signals, and the receiver position can then be mathematically determined from the pseudoranges and the known positions of the satellites. The clock error between the receiver's time reference and the satellite clocks can be eliminated by the availability of signals from an additional satellite. Thus, to solve for three unknown positional coordinates and the clock error requires the acquisition of four satellite signals.

GPS satellites provide two types of signals that can be used for positioning. The pseudorandom digital codes, referred to as the C/A code and the P code, provide unambiguous range measurements to each satellite, but they each have a relatively long "wavelength," of about 300 meters and 30 meters, respectively. Consequently, use of the C/A code and the P code yield position data only at a relatively coarse level of resolution. The other type of signal that can be used for position determination is the carrier signals themselves. The $L_1$ and $L_2$ carrier signals have wavelengths of about 19 and 24 centimeters, respectively. In a known technique of range measurement, the phase of one of the carrier signals is detected, permitting range measurement to an accuracy of less than a centimeter. The principal difficulty with using carrier signals for range measurement is that there is an inherent ambiguity that arises because each cycle of the carrier signal looks exactly alike. Therefore, the range measurement has an ambiguity equivalent to an integral number of carrier signal wavelengths. Various techniques are used to resolve the ambiguity. In a sense, the present invention is concerned with a novel technique for this type of ambiguity resolution.

In absolute positioning systems, i.e. systems that determine a receiver's position coordinates without reference to a nearby reference receiver, the process of position determination is subject to errors from a number of sources. These include orbital and ionospheric and tropospheric refraction errors. For attitude determination applications, the receivers are located so close together that these errors are completely negligible, that is to say they affect both or all three receivers substantially equally. For greater receiver spacings, as in kinematic positioning applications, such errors become significant and must be eliminated. It will be appreciated that the problems of attitude determination and kinematic positioning are closely analogous. The significant difference is that, in attitude determination, the distance between receivers is constrained. As a result, the receivers can be operated from a single reference clock. In a general sense, however, the attitude determination application is simply a more restricted form of the kinematic positioning problem.

In many kinematic positioning applications, a reference receiver located at a reference site having known coordinates is available for receiving the satellite signals simultaneously with the receipt of signals by the remote receiver. Depending on the separation distance, many of the errors mentioned above will be of about the same magnitude and will affect the various satellite signals they receive substantially equally for the two receivers. In this circumstance, the signals received simultaneously by two receivers can be suitably combined to substantially eliminate the error-producing effects of the ionosphere, and thus provide an accurate determination of the remote receiver's coordinates relative to the reference receiver's coordinates.

To properly combine the signals received simultaneously by the reference receiver and the remote receiver, and thereby eliminate the error-producing effects, it is necessary to provide an accurate initial estimate of the remote receiver's coordinates relative to the reference receiver. By far the easiest way to obtain the initial relative position of the remote receiver is to locate it at a pre-surveyed marker. Unfortunately, such markers are seldom available in many practical applications.

Another method often used to obtain an accurate initial relative position is to exchange the receivers and antennas between the reference and remote sites while both continue to operate. This results in an apparent movement between the two antennas of twice the vector difference between them. This apparent movement can be halved and used as the initial offset between them. The approach works well as long as the remote receiver is in the immediate vicinity of the reference site. Unfortunately, any time the satellite signals are lost the initial position must be reestablished, which means that the remote receiver must be returned to the control site or to a nearby marker. This is impractical in many applications, such as photogrammetric survey by aircraft.

In a prior patent to Ronald R. Hatch, U.S. Pat. No. 4,812,991, a method using carrier smoothed code measurements to determine an increasingly accurate initial position was described. This technique had the advantage that it did not require the remote receiver to remain stationary while the initial relative position was established. The disadvantage of that method is twofold. First, it is not an instantaneous method of establishing the initial position and can take several minutes of data collection and processing to accomplish the task. Second it requires access to the the precise (P) code modulation on the $L_2$ carrier frequency. Unfortunately, the United States Department of Defense has reserved the right to limit access to P code modulation by encrypting the P code prior to transmission from each satellite. Therefore, the method described in the prior patent cannot be used when access to the P code is denied.

The aforementioned U.S. Pat. No. 4,963,889 to Hatch describes and claims a satisfactory solution to the problems discussed above, wherein measurements from a minimum number of satellites are used to determine an initial set of potential solutions to the position of the secondary antenna. Redundant measurements from additional satellites are then used to progressively reduce the number of potential solutions to close to one. The only difficulty with the proposed solution occurs when the solution is required very rapidly, and there are not enough satellites in the field of view of the antenna to achieve a rapid solution. For example, one application of kinematic position determination is in instrument landing systems for aircraft. Ideally, the position of the aircraft must be determined in "real time," and waiting for satellites to move to a new angular position, to provide additional measurements that reduce the uncertainty of the position estimate, is not a practical option. Accordingly, there is still need for improvement in this field, to provide a technique that reduces the time needed to eliminate false position solutions. The present invention fulfills this need.

SUMMARY OF THE INVENTION

The present invention resides in a method for determining the coordinates of a remote receiver antenna relative to a reference receiver antenna, using signal received from one or more pseudo satellites, or pseudolites. The remote or secondary antenna is freely movable with respect to the reference antenna, and the process of determining its position is generally referred to as the kinetic positioning problem.

Briefly, and in general terms, the method of the invention includes the steps of making carrier phase measurements based on the reception of a carrier signal from each of a plurality N of satellites, where N is the minimum number of satellites needed to compute the relative position of the secondary antenna, and deriving from the carrier phase measurements an initial set of potential solutions for the relative position, wherein the initial set of potential solutions all fall within a three-dimensional region of uncertainty, and wherein multiple potential solutions arise because of whole-cycle ambiguity of the carrier signal. The method further includes positioning at least one pseudolite transmitter on the ground at a location near an intended path of travel of the secondary antenna, and making redundant carrier phase measurements based on the reception of a carrier signal from the at least one pseudolite. The final step of the method is eliminating false solutions from the initial set of potential solutions, based on a comparison of the redundant carrier phase measurements with the initial set of potential solutions, to reduce number of potential solutions to close to one, whereby the number of potential solutions is not reduced by use of the redundant carrier phase measurements.

The method of the invention may further include making redundant carrier phase measurements based on the reception of a carrier signal from other additional satellites, and eliminating other false solutions from the set of potential solutions, based on a comparison of the additional redundant carrier phase measurements with the initial set of potential solutions. The method may also include comparing items in the set of potential solutions, including those obtained from the redundant phase measurements, with solutions obtained in a prior time interval, to provide another basis for eliminating false solutions. The location of the at least one pseudolite provides for a rapidly changing angular geometry and reduces the time needed to eliminate false solutions.

More specifically, the step of deriving an initial set of potential solutions includes locating points of intersection of planar carrier wavefronts defining possible locations of the secondary antenna within the region of uncertainty, and the step of eliminating false solutions includes locating a set of planar carrier wavefronts from the at least one pseudolite such that the wavefronts also define possible locations of the secondary antenna within the region of uncertainty, selecting, for each of the initial set of potential solutions, a planar carrier wavefront from the additional satellite such that the selected wavefront is the one closest to the potential solution, and disregarding each potential solution for which the closest wavefront from the additional satellite is spaced from the potential solution by more than a selected threshold.

The initial set of potential solutions is initially stored in a local tangent coordinate system, x, y, z, where z is a vertical axis. The method may further comprise the additional step of rotating the coordinate system of the set of potential solutions, to point the z axis toward the additional satellite and thereby facilitate the step of eliminating false solutions. For kinematic positioning, the secondary antenna is freely movable with respect to the reference antenna, and the method further comprises the initial step of determining the approximate initial relative position of the secondary antenna.

In accordance with another aspect of the invention, a pseudolite signal may also provide a communication link between a reference receiver and the remote receiver. The reference receiver or receivers may be located close to the pseudolite transmitter and the pseudolite signal can be modulated in the same way as satellite signals to provide the communication link from the reference receiver to the remote receiver. For real time operation such a communication link is needed to provide to the remote receiver raw measurements or correction data generated at the reference receiver.

It will be appreciated from this summary that the present invention represents a significant advance in the field of satellite-based positioning systems. In particular, the invention resolves whole-cycle ambiguity inherent in carrier phase measurements from satellite signals, and does so in such an efficient and rapid manner that the relative position of an antenna can be computed on a real-time basis to a high degree of accuracy. The most significant aspect of the invention is that it uses redundant measurements from one or more pseudolites to reduce the number of potential solutions to the relative positioning problem, rather than to increase the number of potential solutions. Other aspects and advantages of the invention will become apparent from the following more detailed description, taken in conjunction with the accompanying drawings.

BRIEF DESCRIPTION OF THE DRAWINGS

FIG. 1 is a diagram depicting carrier phase ambiguities in signals received from a single satellite by two antennas of fixed spacing;

FIG. 2 is a diagram similar to FIG. 1 but also showing the phase ambiguities of signals received from a second satellite in the same plane as the first;

FIG. 3 is an elevational view showing the phase ambiguities for the case of signals received from two orthogonally positioned satellites, by a reference antenna and a secondary antenna movable in three-dimensional space at a fixed distance from the reference antenna;

FIG. 4 is a view similar to FIG. 3, but showing phase ambiguities for the case of two non-orthogonal satellites;

DESCRIPTION OF THE PREFERRED EMBODIMENT

Overview

Figure 5:
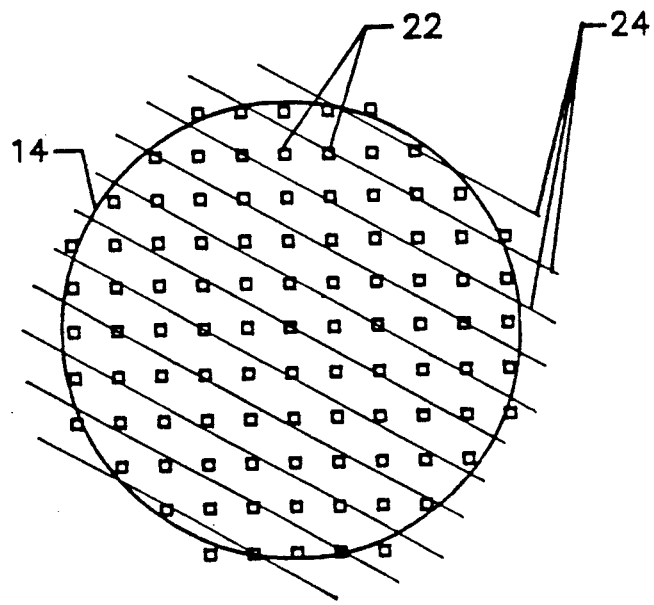
FIG. 5 is a view similar to FIG. 3, but showing the effect of phase ambiguities for the case of three satellites.

As shown in the drawings for purposes of illustration, the present invention is concerned with a technique for determining from received Global Positioning System (GPS) signals the position of a remote receiver antenna relative to a reference receiver antenna. The relative position information can be used in a kinematic positioning system or in an attitude determination system.

As discussed in the background section of this specification, attitude determination can be logically viewed as a special case of kinematic positioning, wherein the distance between the reference and remote antennas is fixed and known. For this reason, explanation of the invention is facilitated by first describing its application to the attitude determination problem.

FIG. 1 is a diagrammatic depiction of two antennas, referred to as A and B, and the attitude determination problem is to find the angular elevation of the line AB between the antennas, by measuring the phase difference between carrier signals arriving at the antennas. Horizontal lines, indicated by reference numeral 10, represent wavefronts of a carrier signal received from a satellite located immediately overhead. It is assumed that the antennas are separated by a known distance equal to five carrier wavelengths, or approximately one meter at the GPS $L_1$ carrier frequency. It is also assumed that the phase difference measured between the two antennas is zero. Because the carrier phase repeats identically every wavelength, there are twenty locations, of which eleven are shown at B1 through B11, where antenna B will see the same phase as antenna A. If the distance AB were less than a carrier wavelength, there would be no ambiguity, but the pointing accuracy would be five times worse. If the length AB were greater than five wavelengths, the accuracy would improve but the number of ambiguities would increase.

One method for resolving the ambiguity is to move one antenna from A to B and to measure the total phase change. For example, in moving from A to B6 there would be no phase change, since B6 is located on the same wavefront as A. Similarly, in moving from A to B5 there is a phase change of 360 degrees. By observing the total phase change in moving from A to the actual position of B, including the number of whole cycles, any phase ambiguity is immediately resolved. Unfortunately, this approach is impractical for many applications.

Another approach, which is the one used in this invention, is to resolve the ambiguity by utilizing signals from a second satellite. FIG. 2 shows how this approach is applied in the simple two-dimensional attitude determination problem depicted in FIG. 1. The measured phase difference for signals from a second satellite may not necessarily be zero, and some other value is assumed here, as might be deduced from the fact that none of the wavefronts 12 from the second satellite passes through the fixed antenna A. The wavefronts 12 are drawn such that antenna A is displaced from one of the lines 12, which represent zero phase, by an amount corresponding to the measured phase difference between antennas A and B, for signals from the second satellite. Thus, any of the lines 12 that passes through one of the points B1-B11 represents a possible solution. As will be observed, the only exact solution is at B6. For the points B2, B4 and B10, there is a poor fit between the point and the lines 12, and none of the other B points fits as precisely to a line 12 as does B6.

If the line AB may be positioned at any angle in three-dimensional space, the position of the remote antenna B is defined by the surface of a sphere with a radius equal to the line AB. This is shown in two-dimensional form in FIG. 3, for the case in which AB is one meter in length and the carrier is $L_1$, with a wavelength of 19 centimeters. The circle 14 in FIG. 3 is an elevational view of a sphere of one-meter radius. Horizontal lines 16 represent wavefronts of the $L_1$ carrier signal from an overhead satellite, and vertical lines 18 represent wavefronts of the $L_1$ carrier signal from a second satellite located at the horizon. The lines 16 and 18 are actually planes of equal phase, which intersect the surface of sphere. These planes intersect each other along straight lines 20, indicated as points in the drawing. Each of the lines 20 intersects the spherical surface at two points, which are seen as being coincident in the drawing. For the example given, there are a total of 11×11 or 121 lines 20, but only 94 of these fall within the projection of the sphere seen in FIG. 3. Thus there are only 188 points of intersection between the lines 20 and the surface of the sphere. Each such intersection represents a possible solution to the wavelength ambiguity of the carrier signal. This is to be distinguished, of course from the possible resolution with which angular position can be determined. Phase differences can be detected to much smaller resolutions than one full wavelength.

FIG. 4 is similar to FIG. 3 except that it shows wavefronts from two non-orthogonal satellites, with the wavefronts indicated by 16 and 18'. The principal difference is that there are fewer intersecting lines 20', giving a total of 126 points of intersection between the lines 20' and the surface of the sphere.

FIG. 5 shows how the availability of signals from a third satellite further reduces the ambiguity inherent in FIG. 3. The points of intersection of the lines 20 and the surface of the sphere are indicated in FIG. 5 as small square areas 22. In practice, the points 20 cannot be achieved because of uncertainties of phase measurement. Hence the representation as small square regions 22. Wavefronts 24 emanate from a third satellite which is assumed, for ease of illustration, to be in the same plane as the first and second satellites. Again it is assumed that there is a zero phase difference between the two antennas receiving this third satellite signal. Therefore, any nonintersection of the planes 24 with the square regions 22 may be eliminated as a possible solution. This reduces the possible solutions to 28 points.

The same principle discussed above can also be applied to the kinematic positioning application. The principal difference is that, instead of being the surface of a sphere, the region of uncertainty is a three-dimensional volume. As already mentioned, four satellite signals are needed to determine the three-dimensional relative position and the clock phase or clock error. However, the clock phase may be considered a "nuisance variable" for present purposes, since the clock phase does not need to assume multiple wholecycle values. The number of potential solutions in an uncertainty volume of one cubic meter is then a maximum of $11^3$ or 1,331. When more than four satellites are available, redundant satellites can be used to reduce the number of these potential solutions.

In general, kinematic position determination includes three major steps: approximately determining the relative position of a remote receiver with respect to a reference receiver, determining all potential solutions that are present in an uncertainty region surrounding the approximate solution, and eliminating false potential solutions in the potential solutions. Specific techniques for performing the first two steps in the kinematic positioning application will be discussed later in this specification.

In accordance with the invention, the step of eliminating false potential solutions includes taking successive measurements using at least one "pseudolite." A pseudolite is a fixed ground-based transmitter, which functions in a communications sense exactly like a satellite transmitter, except that it never moves from its position on the ground.

If the position of the pseudolite is appropriately chosen, such at one side of an aircraft runway, an approaching aircraft using the method of the invention will experience a rapid change in the sensed angular position of the pseudolite. Consequently, false solutions can be more rapidly eliminated than if one had to wait for the angular positions of the satellites to change.

The step of determining all of the potential solutions to the relative position of the remote antenna involves carrier phase measurements obtained at both antennas, using the minimum number of satellites required to obtain a relative solution. These carrier phase measurements are indicative of the range from the receiver antennas to the satellites, but they are ambiguous at the whole cycle level. However, if the relative position of the remote antenna with respect to the reference antenna were known precisely, then the difference in range to the satellite from each of the antennas could also be precisely determined, and from this difference in range the number of whole cycles of phase in the difference of the carrier phase measurements could by computed. But, since the relative position of the remote antenna is known only approximately, the range difference between the two antennas and each satellite is also ambiguous at the whole cycle level. That is to say, several different values of the whole cycle difference in range could possibly be the true whole cycle value of the difference.

As discussed above with reference to FIG. 1, a set of potential solutions can be found which are close enough to the approximate relative position to have a reasonable probability of being the true relative position. In fact, any of the combinations of whole cycle values of carrier phase difference which result in potential solutions within an uncertainty region surrounding the approximate solution could be the true solution.

The number of potential solutions is a function of the size of the uncertainty region and of the wavelength of the carrier signal. The $L_1$ carrier has a wavelength close to 19 centimeters, the $L_2$ carrier has a wavelength close to 24.4 centimeters, and the wavelength of the difference frequency $L_1-L_2$ has a wavelength of about 86 centimeters. Therefore, in any given uncertainty region there are fewer potential solutions if one can use the difference of the carrier phase at the two frequencies than if one must use the $L_1$ or the $L_2$ carrier phase measurements alone. This means that two-frequency receivers are preferred to single-frequency receivers for application of the invention.

In kinematic positioning, the minimum number of satellites needed to solve for the relative position of the remote site with respect to the reference site is four. Measurements to four satellites are required because there are three dimensions of relative position and an additional unknown in the relative clock phase of the two receivers. Consider the difference in carrier phase measurements to one of the four satellites obtained at the two receivers. This difference in the carrier phase measurements across the two sites will be referred to as the "first-difference" of the two measurements. If, for example, the approximate relative position of the two receivers is known sufficiently accurately to be sure that it is within plus or minus 4.3 meters of the true solution, and assuming two-frequency receivers are employed (which allow the use of the 86-centimeter wavelength for the difference frequency), then a total of ten different whole-cycle values could be added to the first-difference of the carrier phase measurements and still agree with the approximate relative position within plus or minus 4.3 meters. In relative to FIGS. 1–4, the region of uncertainty has a radius of 4.3 meters, and ten wavefronts of wavelength 86 centimeters will fall within the region of uncertainty.

Continuing with this example, if ten different whole-cycle values can be added to the first-differences from each of the four satellites, then one might expect $10^4$ or 10,000 possible solutions within the uncertainty region. Indeed, some authors have defined the number of possible acceptable solutions in exactly this fashion. However, only 1,000 of the potential solutions in this example are independent position solutions. The other 9,000 solutions differ from one of the independent solutions only in the whole-cycle value of the clock phase of the two receivers. But this relative whole-cycle value of the clock phase is of no practical interest, and it can be eliminated from consideration in the kinematic positioning application, to prevent any effect on the solution for the relative position coordinates of interest.

Removal of the whole-cycle clock phase measurements in the kinematic positioning application is best illustrated by forming what will be referred to as second-difference measurements. If one of the satellites is chosen as a reference satellite, and the first-difference measurements for this satellite are subtracted from the first-difference measurements for the other three satellites, there remain three second-difference measurements, which are independent of the relative clock phase of the two receivers. Using the same example of uncertainty in approximate position as was used above, there are ten acceptable whole-cycle values that can be added to each of the three second-difference measurements. This leads directly to a conclusion that there are $10^3$ or 1,000 potential solutions in the vicinity of the approximate relative position.

The situation is simpler in the attitude determination application, in which the relative separation distance is generally so short that the two receivers can be designed such that the same clock drives both of the receivers. Therefore, there is no unknown relative clock phase that need to be made part of the solution. This means that the second-difference of the measurements as described above is not required in the attitude determination application. In addition, the separation distance of the two antennas is generally known and can be used to constrain the relative position of the two antennas and leave only a two-dimensional uncertainty region, corresponding to the surface of a sphere, as discussed with reference to FIGS. 3 and 4. Thus, only two satellites are needed to define all the potential solutions that can exist on the two-dimensional uncertainty region.

In brief, then, the kinematic positioning application reduces to a three-dimensional uncertainty problem, requiring three satellites for position measurement and one to handle clock uncertainty, to define all of the potential solutions. The attitude detection application is a two-dimensional uncertainty problem, requiring two satellites to define all of the potential solutions.

The final broad step in the method of the invention is eliminating false potential solutions based on redundant information from additional satellites and, in the case of the present invention, one or more psuedolites. Each additional redundant measurement, whether it is a second-difference measurement in a kinematic positioning application or a first-difference measurement in an attitude determination application, could have multiple whole-cycle values added to it which would still cause the surface defined by the measurement to pass through the uncertainty region. If each of these possible whole-cycle values were used to modify each of the potential solutions, then the number of potential solutions would increase by a large factor. However, only one of the whole-cycle values will result in a surface that passes closer a specific potential solution than any other whole-cycle value. This closest to whole-cycle value (from the additional satellite data) is selected for each of the potential solutions, and is used to modify the redundant measurement for inclusion in that same potential solution. By using only the closest whole-cycle value for the redundant measurement, the number of potential solutions is not increased.

However, even the closest whole-cycle value may still result in the redundant measurement disagreeing substantially with the potential solution. When the redundant measurements as modified by the appropriate whole-cycle value is incorporated into the potential solution, it will result in a large root mean square (rms) residual if it is in substantial disagreement with the original potential solution. Since the potential solution after the redundant measurement is overdetermined, the rms residual error is a quantitative measure of the amount of disagreement. A threshold can be selected which, when the rms residual error exceeds it, results in the potential solution being declared a false solution and removed from the set of potential solutions. The threshold can be adjusted as a function of the carrier phase measurement noise, to result in a high probability of rejecting false solution while maintaining an acceptable low probability of rejecting a true solution.

If enough redundant measurements are available, all of the false solutions can be eliminated with one set of essentially instantaneous measurements from the multiple satellite signals, leaving only the true solution. Even when the set of redundant measurements is insufficient to eliminate all of the false solutions instantaneously, and residual false solutions remain in the set of potential solutions, the redundant measurements are still of great benefit. As the relative geometry of the satellite that provides the redundant measurements changes due to motion of either the satellites or motion of the remote receiver, the specific false solutions which are not eliminated from the set of potential solutions will change. Only the true solution will continue to be a common subset of the set of potential solutions. This allows the true solution to identified more quickly if the geometry changes quickly, even when the redundant measurements are insufficient to identify the true solution instantaneously. In the method of the invention, at least one pseudolite transmitter is placed in a position that ensures a rapid change in the angular position of the pseudolite, as viewed from a moving secondary antenna. For example, if the application of the invention is an aircraft instrument landing system, a pseudolite may be conveniently positioned close to, but to one side of an aircraft runway. An aircraft on a final approach, will view the pseudolite at a rapidly changing angular position. Consequently, false position solutions can be eliminated more rapidly than if only true satellite measurements were used.

The mathematical relationships underlying the concepts described in this overview of the invention will be set out in the following descriptive sections. For convenience, the remainder of this detailed description is divided into two sections, relating to attitude determination and kinematic positioning, respectively. As mentioned earlier, attitude determination may be viewed as a special case of kinematic position determination. To facilitate explanation of the invention, attitude determination is described first. However, the present invention is concerned only with an improvement relating to the kinematic positioning application.

Attitude Determination System

Figure 6A:
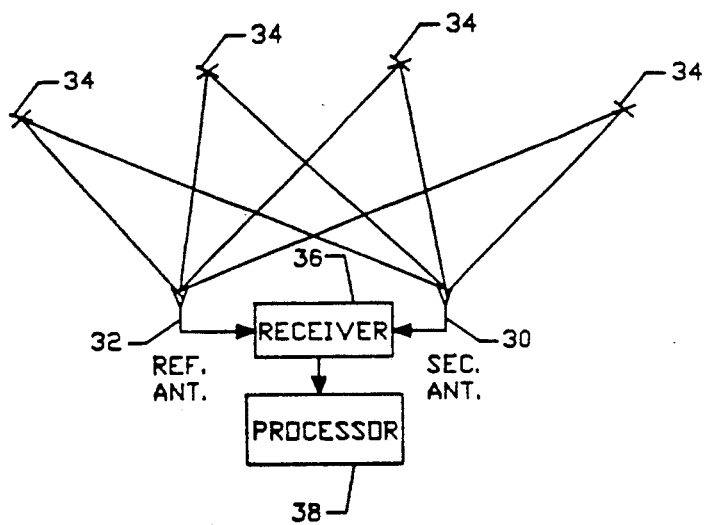
FIG. 6A is a block diagram of apparatus used for attitude determination.

As shown in FIG. 6A, apparatus for accurately determining the orientation of one or more secondary antennas 30 with respect to a reference antenna 32, uses signals broadcast from a plurality of orbiting satellites 34. The apparatus is particularly useful as part of the Global Positioning System (GPS), in which each satellite broadcasts two separate carrier signals, denoted $L_1$ and $L_2$, each modulated by a separate pseudorandom digital code. The entire structure supporting the secondary and reference antennas 30, 32 and an associated receiver 36 is allowed to move, but the distance between the antenna is held fixed. Typical separation distances are on the order of one meter. For the four satellites 34 depicted, there are eight separate links 38 formed between the satellites and the antennas 30, 32.

The $L_1$ and $L_2$ carrier signals broadcast by the four satellites 34 are on the same two frequencies, but each such carrier signal is modulated a pseudorandom digital that is unique to the satellite from which it is transmitted. This provides one method by which the satellite signals may be separated, even though received using omnidirectional antennas. The two antennas 30, 32 are connected to separate receivers or, as illustrated, the same receiver 36, which is driven by a a single reference clock (not shown). The receiver 36 separates the superimposed multiple satellite signals from each other, and demodulates the signals to obtain the pseudorandom digital code. The receiver 36 derives two types of measurements from the received signals. These are referred to as "code measurements" and "carrier measurements." The pseudorandom digital code signals provide an unambiguous measure of the distance to each satellite, referred to as the "pseudorange." This is not necessarily the same as the actual range to the satellite, because of lack of time clock synchronism between the satellite and the receiver. However, the pseudoranges of the four satellites can be used to eliminate the clock error and derive the position of a receiver. However, the relatively long effective "wavelength" of the pseudorandom codes limits the accuracy of the measurements, which is why measurements of carrier phase are made by the receiver. Carrier phase measurements can provide positional data to subcentimeter accuracy, provided there is some way to eliminate the inherent whole-cycle ambiguity of carrier phase measurements.

For operation of the present invention, the receiver 36 should be capable of receiving at least the $L_1$ carrier. As previously discussed, there are advantages in receiving the $L_2$ carrier as well, but this is not an absolute requirement. The code and carrier phase measurements are transmitted to a processor, indicated at 38, which may be incorporated into the receiver 36, where the attitude determination computations are performed. Typically, the code and carrier measurements are made at a rate of ten times per second. The processor 38 may process all of the measurements in real time, or, if it has insufficient processing speed, the measurements may be sampled by selecting only every Nth measurement, where N is often on the order of 10, or the measurements may be compacted by fitting sequential groups of N measurements to a polynomial in time, and the polynomial value at its mid-point point in time is used as a smoothed measurement.

On start-up or if signal reception from some of the satellites has been lost, an initialization procedure must be implemented. This procedure is computation intensive, and ongoing measurements will be sampled or compacted if processing power is limited.

The first computations to be performed in an attitude determination application are to compute the entire set of potential solutions based on the carrier phase measurements from two satellites. One of the significant features of the method described is the use of only two of the satellites to determine the set of potential solutions, rather than more than two satellites. The two satellites used for this computation usually are chosen as the two of highest elevation, or the two that are closest together in angular separation as seen from the reference antenna 30. These choices tend to minimize the total number of potential solutions that must be computed in the initial set. The two satellites chosen are used to compute all possible sets of coordinates of the secondary antenna 32 relative to the reference antenna 30, which satisfy the carrier phase measurements obtained from the two selected satellites, subject to the separation distance constraint.

The process of determining the set of all possible solutions was described in general terms with reference to FIGS. 3 and 4. The planes 16 and 18 define different whole-cycle values of the first-difference measurements from the two satellites, and the intersections of the lines 20 with the spherical surface comprising the region of uncertainty define potential solutions to the relative position of the secondary antenna 30. It will be recalled that, for a wavelength of 19 centimeters ($L_1$) and a one-meter antenna spacing, the number of potential solutions resulting from measurements from two satellites is 188. Although there are 121 lines of intersection between the two sets of planes 16 and 18, only a maximum of 89 of these intersect the spherical surface defining the region of uncertainty. Hence there are 188 potential solutions in this example. Various mathematical techniques may be used to obtain the potential solutions, and to eliminate false solutions. One of these techniques will now be described.

Some equivalent mathematical techniques to compute the potential solutions include the use of a Kalman or Magil filter, the use of sequential least squares, and the use of Square Root Information Filters (SRIF). Information on the SRIF may be found in a text by Gerald J. Bierman entitled "Factorization Methods for Discrete Sequential Estimation," which is Volume 28 of a series on Mathematics, Science and Engineering, published by Academic Press (1977). Some specific computational speed advantages accrue if one uses the SRIF approach, but the equivalent least squares approach yields the same results and is used to describe the method here.

Some definitions are employed to enable compact equations to be used. The position vector, X, is a column vector whose components are the relative cartesian coordinates of the secondary antenna 30 with respect to the reference antenna 32. The column vector, H, is a measurement sensitivity vector whose components are a measure of how much the measurement would change with a change in the respective x, y, and z components of the position vector or matrix X.

Two column vectors $E_1$ and $E_2$ are defined to represent the first-difference phase measurements obtained from the first satellite and the second satellite, respectively. In the ordinary use of least squares solutions, only one answer is obtained and $E_1$ and $E_2$ are single element vectors. However, in the example given above, it is known that there are a potential of 242 solutions. The specific whole-cycle modified first-difference measurement from the first satellite corresponding to each of these solutions must be an element of $E_1$, and similarly the whole-cycle modified first-difference measurements from the second satellite corresponding to each of the solutions must be an element of $E_2$. In the case of the example above, 11 different values of first-differences were found, but each of these values must be repeated 22 times when forming $E_1$ so that each value can be paired with each of the 11 values of first-difference from the second satellite, and each of these needs to be paired with the mirror image. The same is of course true when forming $E_2$.

For later use, standard rotation $3 \times 3$ rotation matrices are defined: $R(a)_z$ is a coordinated rotation through and angle, a, corresponding to the azimuth of a satellite about the z axis; and $R(e)_x$ is a coordinate rotation through an angle, e, corresponding to the complement of the elevation angle of the satellite about the x axis.

The $3 \times 3$ identity matrix, I, is defined as the all-zero matrix except that the diagonal elements are one. The coordinate system chosen is in the local tangent plane to the earth, with East, North and Up corresponding to x, y and z cartesian coordinates, respectively.

For several reasons, it is advantageous to rotate the coordinate system each time a new satellite is processed. First, a rotation around the z axis is performed so that the y axis points in the azimuth of the satellite, and then a rotation around the x axis so that the z axis points directly toward the satellite. This has the advantage that the sensitivity vector, H is sensitive to the rotated z component only, i.e. its x and y components are zero and the z component is one.

The normal sequential least squares equation is given by:

$$A_i X = V_i \quad (1)$$

where the subscript i indicates which successive satellite's measurements are being incorporated. When no rotations are performed between successive satellites, A and V are defined by:

$$A_i = H_i H_i^T + A_{i-1} \quad (2)$$

$$V_i = H_i E_i^T + V_{i-1} \quad (3)$$

The superscript T means the matrix transpose and $E_i$ means $E_1$ or $E_2$, depending on whether it is the first or second satellite, respectively. The initial values of the elements of the matrices A and V are all zeros.

When rotations are performed between the inclusion of measurements from different satellites, then equations (2) and (3) become:

$$A = HH^T = R(e)_x R(a)_z A_{i-1} [R(e)_x R(a)_z]^T, \quad (4)$$

$$V = HE^T = R(e)_x R(a)_z V_{i-1}, \quad (5)$$

The subscript has been dropped from the H sensitivity vector, since its definition is always the same in a coordinate system where the range to the satellite only has a z component. The rotation angles defined by the azimuth and elevation angles are the azimuth and elevation angles as defined in the coordinate system. Thus, they need to be adjusted for the cumulative rotations. The cosine and sine of the azimuth and elevation can be computed directly from the direction of the satellites. As long as the direction cosines are rotated to each new coordinate system, then the azimuth and elevation angles will be correct. Use was made in equations (4) and (5) of the orthogonality constraint which causes the transpose of a rotation matrix to be given the rotation matrix with the direction of rotation reversed.

No matter how equation (1) is obtained, its solution is:

$$X = A^{-1} V \quad (6)$$

where $A^{-1}$ is defined as the inverse of A, such that $A^{-1} A = I$.

As stated above, orthogonality conditions require that the transpose of the rotation matrices is the same as the rotation around the negative angle. Thus the matrix of solution vectors X can be converted back to the original coordinate system at any point by rotating appropriately by the negative of the azimuth of the last satellite included.

$$X_{enu} = R(-a)_z R(-e)_x X, \quad (7)$$

where the subscript enu means in the east, north and up coordinates, and the elevation and azimuth angles are defined in the east, north and up coordinate system.

The incorporation of the first-difference measurements using equations (4) and (5) for the first satellite and then for the second satellite results in a least squares matrix equation which has all zero elements in the x components. The reason is that measurements from only two satellites are two-dimensional and correspond to the y,z plane. Obtaining the x component of the solutions involves a special process. Equation (6) is used to solve for the y and z components, which are the second and third rows of the matrix X. The first row corresponding to the x components is zero.

The Pythagorean theorem is used to obtain the x components of the solutions by constraining the solution to the appropriate sized sphere. A separation distance between the antennas of one meter, or 5.26 wavelengths, results in a sphere of which the radius is the same, and gives the following equation:

$$x = \pm \sqrt{(5.26)^2 - y^2 - z^2} \quad (8)$$

If the value inside the square root is positive and than some small threshold, then the positive square root is assigned to one of the pair of solutions with identical measurement components in $E_1$ and $E_2$ and the negative square root is assigned to the other. If the value inside the square root is negative, and negative by more than some small threshold, then it dose not correspond to a valid solution and the pair of columns with the associated y and z components is removed from the X matrix and the V matrix so that their longitudinal dimension is reduced by two. If the value inside the square root is very near zero, with the specific threshold related to the noise in the carrier phase measurements, the value of the x component is set to zero in only one of the pair of columns of X with the associated y and z components. The second column in the pair is removed from the potential solutions in the same manner described above and the dimension of X and V is reduced by one. This last solution corresponds to the situation when the line defined by the pair of first-difference equations does not pass through the sphere but just touches it at one point.

The elements in the top row and first column corresponding to the x component of A are still zero and they cannot remain zero if the solution is to be constrained to the spherical surface. Inserting a single value in the element in the first column and the first row will constrain the solution. A value of one in this element will make the constraint equal in strength to the first-difference equations. Larger values constrain the solution closer and closer to the sphere. The choice of a value of one is recommended since it allows the solution to move slightly off the surface of the sphere to fit subsequent first-difference measurements from additional satellites as appropriate to noisy measurements from the first two satellites. Whatever the choice of the first diagonal element of A, equation (1) must be reversed to set the elements in the first row of B using the corresponding values computed above for the elements of X.

$$V = AX \qquad (9)$$

The complete set of potential equations using two satellites is now defined using the least squares equations. The matrices A, X and V contain all the required information in the form of equation (1) and can be inverted for the specific coordinates in the form of equation (6).

The sequential processing of first-difference measurements from additional satellites can now be described. The process is very similar to the process given in equations (4) and (5) except that the process described there must be modified to allow the appropriate construction of the first-difference measurement vector $E_i$ corresponding to satellite i, where i sequentially takes on the values 3, 4, .... First the incoming matrices A and V are rotated appropriately for the i'th satellite.

$$A_{i-1} = R(e)_x R(a)_z A_{i-1} R(-a)_z R(-e)_x \qquad (10)$$

$$V_{i-1} = R(e)_x R(a)_z V_{i-1} \qquad (11)$$

A and V in equations (10) and (11) retain the same subscript since the measurement data from the i'th satellite are still not included The only change caused by equations (10) and (11) is to rotate the coordinate system.

Now the rotated A and V matrices are used in equation (6) to give rotated coordinates of the potential solutions as the elements of X. Actually X could have been rotated directly, but since the rotated forms of A and V are needed later it is beneficial to rotate them and then solve the equation (6). The solution (6) can be simplified if desired, since only the z components or third row elements of X are needed in the next step.

Using the same example of a one-meter or 5.26 wavelengths separation distance between antennas, it is clear that 11 different values of the first-difference measurement can be constructed. But a complete set of potential equations has already been found that spans the entire spherical surface. If subsequent satellites would result in different solutions, then they would agree with the solution from the first two satellites. This would represent a false solution, since a true solution must agree with all of the measurements. Thus, each element of the first-difference measurement vector $E_i$ must be selected from the 11 different possible first-difference values, such that it is the value closest to the corresponding solution of in X. The motivation for this requirement is that any other value of the first difference should clearly disagree with the existing solution by at least one-half a cycle and would therefore, of necessity, be a false solution.

Since the first-difference values are measures of the distance of the secondary antenna from the reference antenna in the direction of the satellite, and since the z component is in the direction of the satellite, the appropriate element of $E_i$ is found by selecting from the 11 possible values the one which is closest to the associated z component of X. One could, if the closest possible value of the first-difference differs by more than a given amount, declare the solution a false one, and remove it from further processing. However, it is safer to construct a complete $E_i$ vector and incorporate it into the potential solutions. This is done now that the $E_i$ vector is constructed by following equations (10) and (11) with:

$$A = HH^T - A \qquad (12)$$

$$V = HE_i^T - V_i \qquad (13)$$

The resulting new values of A and V can be solved for updated values of the X, and the rms residuals of the solutions can be used to eliminate those potential solutions which are highly unlikely to be the true solution. An alternative is to compute the updated residual with respect to the last satellite only. This can be done by using equation (6) again to solve for new z components and differentiating them with the corresponding value of $E_i$. A positive threshold and its negative could then be used to eliminate all potential solutions of which the residual was greater than or less than the threshold. The threshold value is a function of the measurement noise and is chosen such that there is a reasonable probability of eliminating false solutions and a high probability that the true solution is not eliminated.

After all the potential solutions are checked, the false solutions eliminated and the corresponding matrix and vector sizes reduced, the whole process is repeated with the next satellite until the first-difference measurements from all the satellites have been processed. Ideally, when all satellites have been processed only one solution, the true solution, remains in the set of potential solutions. But even if multiple potential solutions remain, the true solution can still be determined using subsequent measurements from the same satellites.

Each of the potential solutions can be identified by three indices j, k, and l. The j index corresponds to the choice of whole-cycle value for the first satellite's first-difference measurement. and thus in the example would range between +5 and −5. The k index corresponds to the choice of whole-cycle value for the second satellite and has the same range as the j index. The l index has only two values. +1 and −1. corresponding to the choice of the plus square root or the minus square root in equation (8).

As long as the signals from each of the satellites are continuously received. the change in the whole cycles of the first differences is accumulated in the measurements. This means that the indices from one set of measurements can be related to the indices obtained at subsequent times from additional sets of measurements. But the changing geometry of the satellites relative to the antennas, due to either satellite motion or due to antenna motion. will cause the different false solutions to appear in the potential solution set. Only the true solution can remain in the potential solution set at each point in time. Thus the true solution can be clearly identified as the geometry changes.

Once the true solution is identified, and as long as no loss of signal is encountered. the measurements can simply be modified by the whole-cycle value indicated by the true solution indices. and the modified measurements fed into a standard Kalman filter or least squares smoothing filter to obtain a continuing estimate of the orientation. In an off-line modest rate the computations described above can be performed to ensure that the signals have not been lost and that the true solution that is subsequently obtained has the same indices as that being used in the active processing filters.

Kinematic Positioning System

The kinematic positioning system is only modestly different from the attitude determination system. The significant difference in the apparatus is that. in the kinematic system. the remote movable antenna and receiver are typically far enough removed from the reference antenna and receiver that they cannot be connected to the same reference clock. In addition, there is no separation distance constraint in the kinematic positioning system. and the reference receiver location must remain fixed. The minimum number of satellites required to obtain a solution was two satellites for the attitude determination system. The kinematic positioning system requires a minimum of four satellites. One satellite is required for solution and removal of the differences in carrier phase caused by the separate local reference clocks at the two receivers; and three satellites are required to obtain the three-dimensional coordinates of the remote receiver antenna relative to the reference receiver antenna. To allow a search through a set of potential solutions similar to that used in the attitude determination system, at least one more satellite is required to provide a set of redundant measurements.

Figure 6B:
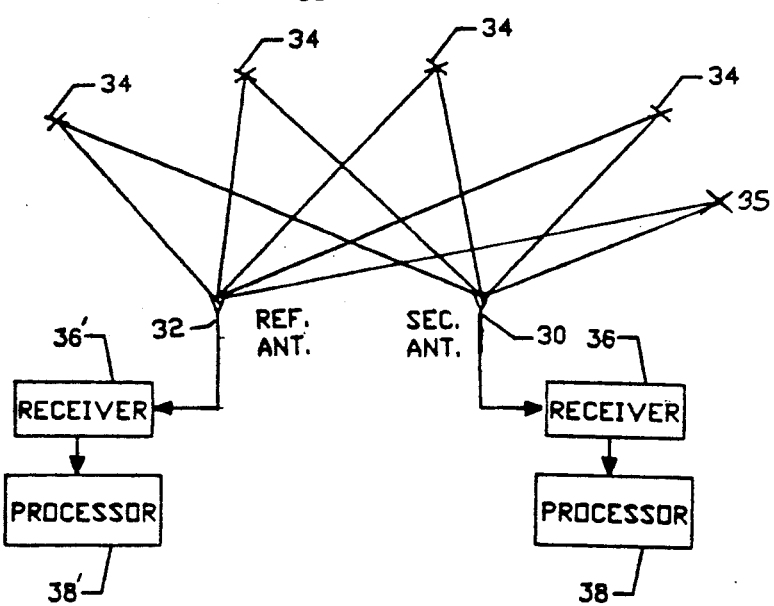
FIG. 6B is a block diagram of apparatus used in accordance with the invention for kinetic position determination.

FIG. 6B is a block diagram showing how the method of the invention is used for kinetic position determination. In this case, the secondary antenna 30 is movable with respect to the reference antenna 32. which has its own separate receiver 36′ and processor 38′. The other significant difference is that. in addition to the four satellites 34 shown. there is at least one pseudolite 35 installed at a fixed location on the ground. Because the pseudolite 35 is much closer to the secondary antenna 30 than the satellites. movement of the secondary antenna can provide extremely rapid changes in the angular position of the pseudolite.

Before a set of potential solutions can be constructed for the kinematic positioning system. an initial approximate position of the remote receiver must be obtained. This was not required in the attitude determination system. because the distance between the antennas was short and held fixed at a specific value.

Several methods are available for establishing the initial approximate position. If the remote receiver is moving. the best method is undoubtedly to use differential carrier smoother code measurements in a standard navigation Kalman filter implementation. If the remote receiver is stationary, then standard triple-difference or integrated Doppler implementation can yield competitive accuracy. Whatever method is used to establish the approximate positions, it is important to also determine the approximate uncertainty in the relative coordinate values. Typical strategies require that the uncertainty region over which the potential solutions are evaluated have a range of at least plus or minus three times the standard deviation in each dimension.

Once an initial position is established. four satellites are selected to establish the initial set of potential solutions. The simplest implementations usually involve the computations of the second-differences of the carrier measurements. First-differences of the carrier phase measurements are computed just as they were in the attitude determination system for all satellites. Specifically, the carrier phase measurement at the reference site for each satellite is subtracted from the carrier phase measurement at the remote site for the corresponding satellite. Then. in order to remove the effects of different reference clock phase at the two receivers, the first-difference of carrier phase measurements from one of the satellites selected as a reference satellite is subtracted from the first-difference carrier phase measurements from each of the other satellites. The result is a set of three second-difference carrier phase measurements.

Just as the first-difference carrier phase measurements were ambiguous over a region of two-dimensional space in the attitude determination system. so the second-difference phase measurements are ambiguous in a region of three-dimensional space. For illustrative purposes. assume that the uncertainty region is a three-dimensional volume about two meters in length in each direction. Assume also that only $L_1$ signals are obtained by the receivers and that the carrier phase wavelength is approximately 19 centimeters. The second-difference carrier phase measurements associated with each of the satellite pairs could then have about 11 acceptable whole-cycle values that would intersect the uncertainty region. Thus, the number of potential solutions would be $11^3$ or 1,331 potential solutions.

No special process is required to obtain each of these solutions. as was the case in the attitude determination system. The measurement vectors $E_1$, $E_2$ and $E_3$ are each 1,331 elements long and are formed by choosing all possible difference measurements. The measurements associated with the first satellite pair of second-difference measurements are entered as elements of $E_1$, and the second satellite pair with $E_2$, and the third satellite pair with $E_3$. The coordinates are rotated and the measurements are incorporated into A and V via equations (4) and (5), just as they were in the attitude determination system. After the measurements from the four satellites are incorporated via the three sets of second-difference measurements. the least square equation for the matrix X could be solved using equation (6) for the set of coordinates of all the potential solutions, though the solutions is not explicitly required at this point.

The next step is to commence the elimination of false solutions, in almost exactly the same way as in the attitude determination application. However, instead of using first-differences of the redundant satellites, the second-differences are formed by subtracting from each of the redundant first-differences the first-differences measurement obtained from the same reference satellite that was used earlier in forming the original second-difference measurements. This new redundant set of second-difference measurements is ambiguous and presumably can have, for example, 11 different possible whole-cycle values. As described previously for the attitude determination system, the A and V matrices are rotated using equations (10) and (11). Then the rotated least squares matrix is solved for X to obtain the z component of each potential solution. The second-difference measurement vector $E_i$ is constructed by choosing for each element the specific whole-cycle value of the second-difference measurement closest to the associated z component in the X matrix.

Equations (12) and (13) are then implemented and, based on the residuals, computed in the same fashion as in the attitude determination solution, false values being detected and eliminated. The above process is repeated for each of the redundant satellites and, ideally, only the true solution will remain after all of the redundant satellites have been processed.

Just as in the attitude determination system, if there are multiple potential solutions left when all of the redundant satellites have been processed it is still possible to identify the correct solution if one is willing to wait while the satellite geometry changes. Repeating the entire process using data collected at subsequent time intervals leads to new sets of potential solutions and indices. as described earlier, can be constructed relating the potential solutions between data sets. Only the true solution will continue to remain a common element in the sets of the potential solutions.

Once the true solution is identified, the modified second-difference equations are sent directly to a Kalman filter or least squares smoothing filter for a continuing smoother output of relative remote receiver coordinates. The process described above can continue to be computed at a slow rate to ensure that an inadvertent loss of signal has occurred. Such a loss of signal would be signaled by a new true solution whose indices would be different from the prior true solution.

Summary of Ambiguity Resolution

Figure 7:
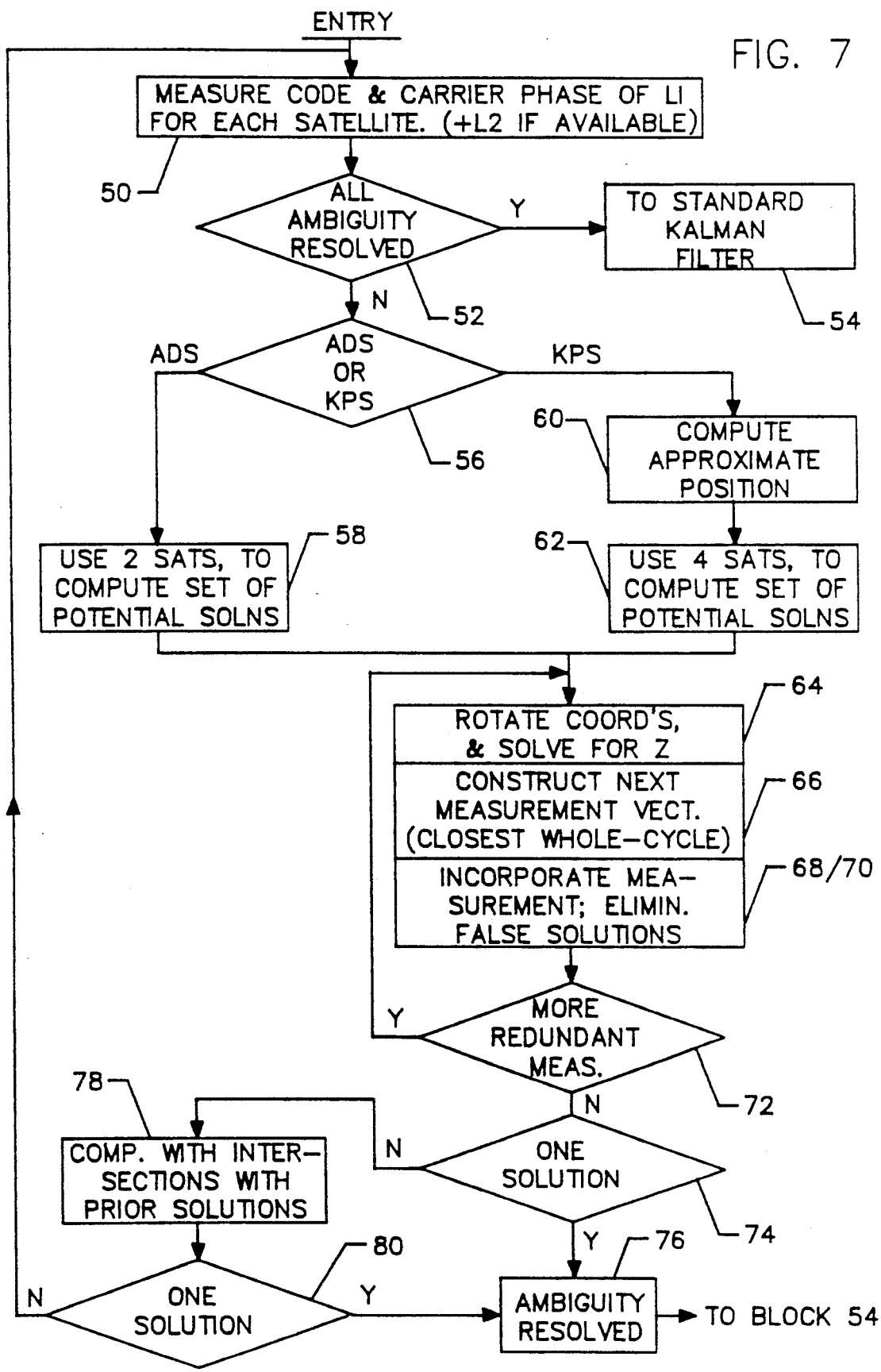
FIG. 7 is a flowchart of the process steps performed in accordance with the invention.

The method steps for resolving whole-cycle ambiguity in kinematic positioning and, incidentally, in attitude determination, are shown in flowchart form in FIG. 7. Basically, these are the steps performed in the processor 38 (FIG. 6B).

The first step in the processing loop illustrated in FIG. 7 is, as shown in block 50, to measure the code an carrier phase for $L_1$ (and $L_2$ if available) from each satellite. In decision block 52, the question posed is whether initial ambiguities is the relative position of the secondary antenna with respect to the reference antenna have been resolved. Clearly, on a first pass through this flowchart the answer will be in the negative. If the answer is affirmative, the relative position information is passed to a standard Kalman filter for smoothing and output, as indicated in block 54. If ambiguities have not yet been resolved, another decision block 56 poses the question whether this is an attitude determination system or a kinematic positioning system. Normally, these systems would not be incorporated into one processor, but the flowchart is intended to show the commonality of the two systems. In an attitude determination system, only two satellites are initially employed, as indicated in block 58, to compute a set of potential solutions, located in an uncertainty region on the surface of a sphere. In a kinematic positioning system, the next step is to compute an approximate relative position for the remote antenna, as indicated in block 60; then to use four satellites to compute a set of potential solutions located in a three-dimensional uncertainty volume, as indicated in block 62.

The remaining blocks in the flowchart are common to both types of systems. The first of these blocks, at 64, performs a coordinate rotation such the z (vertical) axis is pointed directly to a selected redundant satellite, and for each measurement the processor solves for the z component. Then, in block 66, the processor constructs a measurement vector by choosing a whole-cycle value nearest to the z component for each potential solution. The resulting new measurement is incorporated into the matrix of potential solutions, as in block 68. Then, false solutions are edited out of the matrix using a residual threshold, as indicated in block 70. In block 72, a check is made to determine if additional redundant measurements remain to be processed for the redundant satellite under consideration. If so, return is made to block 64 to continue processing. If not, a check is made in block 74 to determine if only one potential solution remains. If so, the ambiguity has been resolved and this part of the processing is complete, as indicated at 76, and processing is continued in block 54, using the standard Kalman filter. If more than one solution still remains, processing continues in block 78, where a comparison is made for intersection of prior solutions, i.e. solutions reached at earlier time intervals and different satellite geometries. Implied in this block is the further elimination false solutions based on their failure to recur at successive time intervals. In decision block 80, another check is made for the existence of a single solution. If the ambiguity has been totally resolved, processing continues via blocks 76 and 54. If there is still ambiguity, processing continues in block 50, using data from a different redundant satellite.

Because the geometry of the antenna system changes so rapidly with respect to the pseudolite 35, false solutions can be eliminated much more rapidly than if four real satellites are used. The invention works best when the pseudolite or pseudolites are used in addition to four satellites. The satellites provide a set of solutions and the additional one or more pseudolites provide redundancy in two respects: first by providing an additional one or more set of measurements, equivalent to having one or more additional satellites, and secondly by providing still further sets of different measurements as the secondary antenna is moved to new positions and the angular positions of the pseudolites changes. In the case of a secondary antenna located on a moving aircraft, the use of one or more pseudolites reduces the ambiguity resolution time to a matter of seconds, as compared with minutes when the pseudolites are not used. To be effective, the pseudolites must be positioned to provide a rapid angular position change as the secondary antenna moves along its normally intended path. For example, a pseudolite should not be located in line with an aircraft's final approach, or the angular position might not change at all during a critical phase of the landing. But if a pseudolite is positioned well to one side of the runway, the rate of change of angular position can be maximized for a critical point in the approach path. Multiple pseudolites can be appropriately positioned for landing on multiple runways.

It will be appreciated from the foregoing that the present invention represents a significant advance in the field of satellite-based differential positioning systems. In particular, the invention provides a novel technique for removing whole-cycle ambiguity from carrier phase measurements of relative position, in kinematic positioning systems, by using one or pseudolites to reduce the time needed to resolve the ambiguity. It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. A method for determining the relative position of a secondary receiving antenna with respect to a reference receiving antenna in a satellite-based positioning system, the method comprising the steps of:
   making carrier phase measurements based on the reception of a carrier signal from each of a plurality N of satellites, where N is the minimum number of satellites needed to compute the relative position of the secondary antenna;
   deriving from the carrier phase measurements an initial set of potential solutions for the relative position, wherein the initial set of potential solutions all fall within a region of uncertainty defined by a sphere having a radius equal to the maximum distance between the two antennas, and wherein multiple potential solutions arise because of whole-cycle ambiguity of the carrier signal;
   positioning at least one pseudolite transmitter on the ground at a location near an intended path of travel of the secondary antenna;
   making redundant carrier phase measurements based on the reception of a carrier signal from the at least one pseudolite; and
   eliminating false solutions from the initial set of potential solutions, based on a comparison of the redundant carrier phase measurements with the initial set of potential solutions, to reduce number of potential solutions to close to one, whereby the number of potential solutions is not increased by use of the redundant carrier phase measurements.

2. A method as defined in claim 1, and further comprising the steps of:
   making redundant carrier phase measurements based on the reception of a carrier signal from other additional satellites; and
   eliminating other false solutions from the set of potential solutions, based on a comparison of the additional redundant carrier phase measurements with the initial set of potential solutions.

3. A method as defined in claim 1, and further comprising the steps of:
   comparing items in the set of potential solutions, including those obtained from the redundant phase measurements, with solutions obtained in a prior time interval, to provide another basis for eliminating false solutions; wherein the location of the at least one pseudolite provides for a rapidly changing angular geometry and reduces the time needed to eliminate false solutions.

4. A method as defined in claim 1, wherein:
   the step of deriving an initial set of potential solutions includes locating points of intersection of planar carrier wavefronts defining possible locations of the secondary antenna within the region of uncertainty; and
   the step of eliminating false solutions includes, locating a set of planar carrier wavefronts from the at least one pseudolite such that the wavefronts also define possible locations of the secondary antenna within the region of uncertainty, selecting, for each of the initial set of potential solutions, a planar carrier wavefront from the additional satellite such that the selected wavefront is the one closest to the potential solution, and disregarding each potential solution for which the closest wavefront from the additional satellite is spaced from the potential solution by more than a selected threshold.

5. A method as defined in claim 1, wherein:
   the initial set of potential solutions is initially stored in a local tangent coordinate system, x, y, z, where z is a vertical axis; and
   the method further comprises, after the step of making redundant carrier phase measurements, the additional step of rotating the coordinate system of the set of potential solutions, to point the z axis toward the additional satellite and thereby facilitate the step of eliminating false solutions.

6. A method as defined in claim 4, wherein:
   the initial set of potential solutions is initially stored in a local tangent coordinate system, x, y, z, where z is a vertical axis; and
   the method further comprises, after the step of making redundant carrier phase measurements, the additional step of rotating the coordinate system of the set of potential solutions, to point the z axis toward the additional satellite and thereby facilitate the step of eliminating false solutions.

7. A method as defined in claim 6, wherein the step of selecting a planar carrier wavefront from the additional satellite is performed by comparing the z-axis component of each potential solution with possible positions of wavefronts in the region of uncertainty.

8. A method as defined in claim 1, wherein:
   the method further comprises the initial step of determining the approximate initial relative position of the secondary antenna.

9. A method as defined in claim 8, wherein:
   the step of determining the approximate position includes making measurements of pseudorandom codes received from the satellites, and computing the approximate position from the code measurements.

10. A method as defined in claim 1, and further comprising the steps of:
    positioning the reference receiving antenna and an associated reference receiver close to the pseudolite; and
    using the pseudolite signal to transmit measurement and correction data from the reference receiver to the secondary antenna.

* * * * *